(12) United States Patent
Sauermann

(10) Patent No.: US 7,730,053 B2
(45) Date of Patent: Jun. 1, 2010

(54) METHOD AND SYSTEM FOR BOOLEAN EXPRESSION QUERY OPTIMIZATION

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 10/559,513

(22) PCT Filed: Jun. 2, 2004

(86) PCT No.: PCT/EP2004/050988

§ 371 (c)(1),
(2), (4) Date: Aug. 16, 2006

(87) PCT Pub. No.: WO2004/109542

PCT Pub. Date: Dec. 16, 2004

(65) Prior Publication Data

US 2007/0038597 A1   Feb. 15, 2007

(30) Foreign Application Priority Data

Jun. 4, 2003  (EP)  ................................. 03012687

(51) Int. Cl.
*B06F 7/00*  (2006.01)
*B06F 17/30*  (2006.01)
(52) U.S. Cl. ....................... 707/713; 707/755; 707/759; 707/769
(58) Field of Classification Search ........................ None
See application file for complete search history.

(56) References Cited

U.S. PATENT DOCUMENTS

| 5,664,172 | A |   | 9/1997 | Antoshenkov |
| 5,666,528 | A | * | 9/1997 | Thai ........................... 707/102 |
| 5,794,227 | A | * | 8/1998 | Brown .......................... 707/2 |
| 6,439,783 | B1 |   | 8/2002 | Antoshenkov |

OTHER PUBLICATIONS

"International Search Report of Application No. PCT/EP2004/050988", (Dec. 16, 2004).

* cited by examiner

*Primary Examiner*—John R Cottingham
*Assistant Examiner*—Michael Pham
(74) *Attorney, Agent, or Firm*—Brake Hughes Bellermann LLP

(57) ABSTRACT

Method and computer system for logically evaluating a Boolean expression used in a query statement to optimize the query. The Boolean expression refers to an attribute and includes a plurality of conditions. The Boolean expression is received (410) and decomposed (420) into the plurality of conditions. For each condition at least one condition value referring to the attribute is extracted (421) from the condition. The at least one condition value is then inserted (422) into a condition value list in sorted order. A relationship vector of the at least one condition value is initialized (423). Then the relationship vectors of the at least one condition value and of each further condition value that is in the condition list and that is in the value range of the condition are adjusted (424). After having processed all conditions the Boolean expression may be reducing (430) according to each relationship vector.

24 Claims, 3 Drawing Sheets

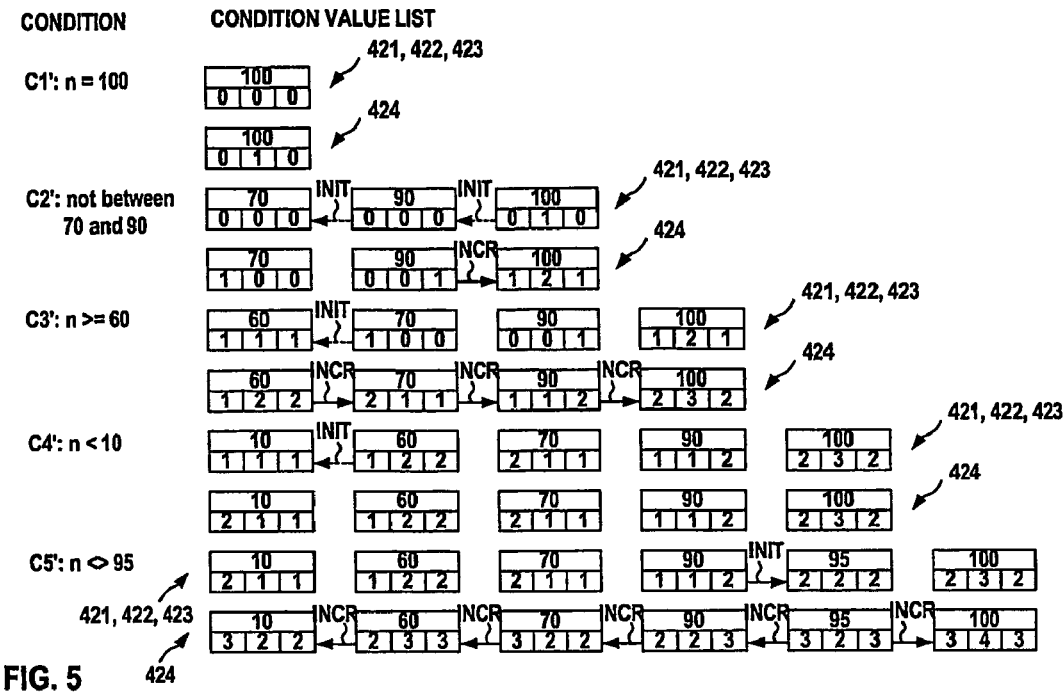
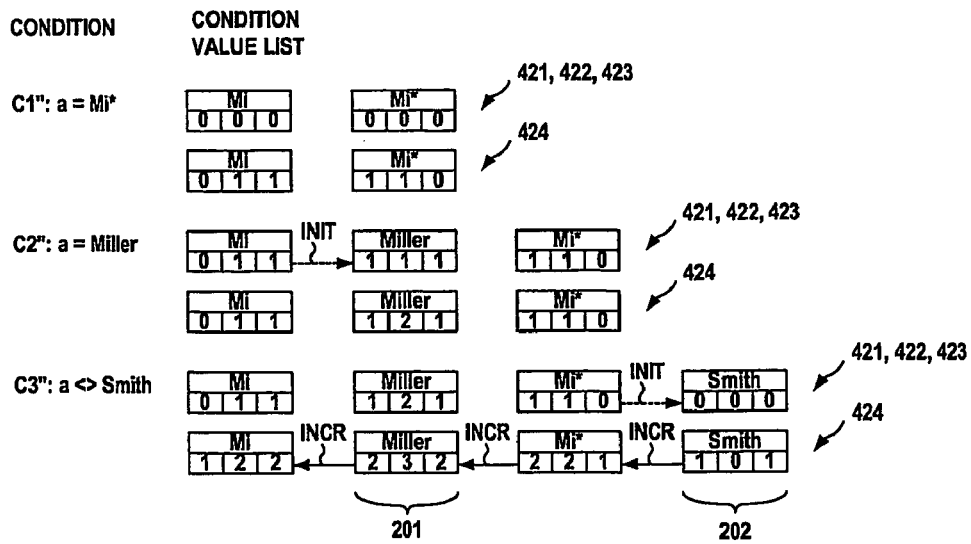
FIG. 5
FIG. 6

METHOD AND SYSTEM FOR BOOLEAN EXPRESSION QUERY OPTIMIZATION

CROSS-REFERENCE TO RELATED APPLICATIONS

This application is a national phase filing of, and claims priority under 35 U.S.C. 371 to, PCT Application No.: PCT/EP2004/050988 (published in English as WO 2004/109542), filed on Jun. 2, 2004 and titled METHOD AND COMPUTER SYSTEM FOR QUERY OPTIMIZATION, which claims priority to European application 03012687.4 (published as EP 1484691), filed on Jun. 4, 2003, and titled METHOD AND COMPUTER SYSTEM FOR OPTIMIZATION OF A BOOLEAN EXPRESSION USED FOR QUERIES.

FIELD OF THE INVENTION

The present invention generally relates to electronic data processing, and more particularly, relates to methods, computer program products and systems for data retrieval.

BACKGROUND OF THE INVENTION

Some applications provide query interfaces that allow a user to define Boolean expressions that include multiple conditions for selecting data from a computer system, such as a database system or a file system. For example, the Boolean expressions can be written in a standard query language (SQL). They are then sent to the computer system, where they are executed. Examples of such a computer system are described in the patent applications WO 02/061612 and WO 02/061613. A Boolean expression can include multiple conditions which are combined by Boolean operators. A condition typically includes an attribute name, an operator, and a value or a value range.

For example, the following three conditions referring to the attribute birth_date may be combined with AND or OR operators.

birth_date between 1938 and 1990
birth_date <=1940
birth_date >1920

Advantageously, within the system the complete Boolean expression is processed in disjunctive or conjunctive normal form. In this example, it is assumed that all conditions are combined with a Boolean AND or that all conditions are combined with a Boolean OR. If there are many conditions in the Boolean expression, it may happen intentionally or unintentionally that some of the conditions refer to the same attribute.

Some combinations of conditions referring to the same attribute may either lead to uninteresting results for logical reasons or cause more conditions than necessary to be passed to the computer system. The following cases may be distinguished:

Null set: The result set is empty (zero records found). This may happen if all the conditions are combined with AND.

Entire search domain: The result set consists of all records loaded into or stored in the computer system, so the selectivity is zero. This may happen if the conditions are combined with OR.

More conditions than necessary: two or more of conditions referring to the same attribute have an overlap with respect to their selectivity. That is, there is some redundancy in the conditions of the Boolean expression.

SUMMARY OF THE INVENTION

The present invention provides methods, computer program products, and computer systems as described by the independent claims to simplify a Boolean expression by summarizing several of its conditions referring to the same attribute into fewer (one or more) conditions. Providing a simplified or reduced Boolean expression in a query to a computer system can result in a more efficient selection process, since there is a reduced number of conditions to be evaluated and therefore a reduced number of potentially large interim result sets to be combined.

Further, a pre-evaluation of the Boolean expression can show that the combination of the conditions evaluates to either zero records or all records for logical reasons. In this case, there is no value at all in sending the query to the computer system. That is, the work load of the computer system can be kept lower when using a pre-selection mechanism for Boolean expressions according to the present invention.

In one embodiment of the present invention, a graphical user interface (GUI) can be used to perform the pre-evaluation and inform a user.

The aspects of the invention will be realized and attained by means of the elements and combinations particularly pointed out in the appended claims. Also, the described combination of the features of the invention is not be understood as a limitation, and all the features can be combined in other constellations without departing from the spirit of the invention. It is to be understood that both the foregoing general description and the following detailed description are exemplary and explanatory only and are not restrictive of the invention as described.

BRIEF DESCRIPTION OF THE DRAWINGS

FIG. 5 illustrates a second example of applying the method referring to a numerical attribute; and FIG. 6 illustrates a third example of applying the method referring to an alphanumeric attribute.

DETAILED DESCRIPTION OF THE INVENTION

The same reference numbers are used throughout the drawings to refer to the same or like parts.

Definitions of terms, as used hereinafter:

Boolean operators: operators used in Boolean statements, e.g., AND, OR.

Relational operators:

operators used in relational statements, e.g.,

< (less than)
<= (less than or equal to)
> (greater than)
>= (greater than or equal to)
= (equal to)
<> (not equal to)
[. .] (between)
]. .[ (not between)

Relational operators may be combined with a Boolean NOT. Such a combined expression can be translated into a pure relational operator. For example, "NOT >" corresponds to "<=".

Condition:

relational statement comparing data, such as numerical data or alphanumeric data, using one or more relational operators.

Boolean expression:

statement including multiple conditions that are combined using Boolean operators.

Figure 1:
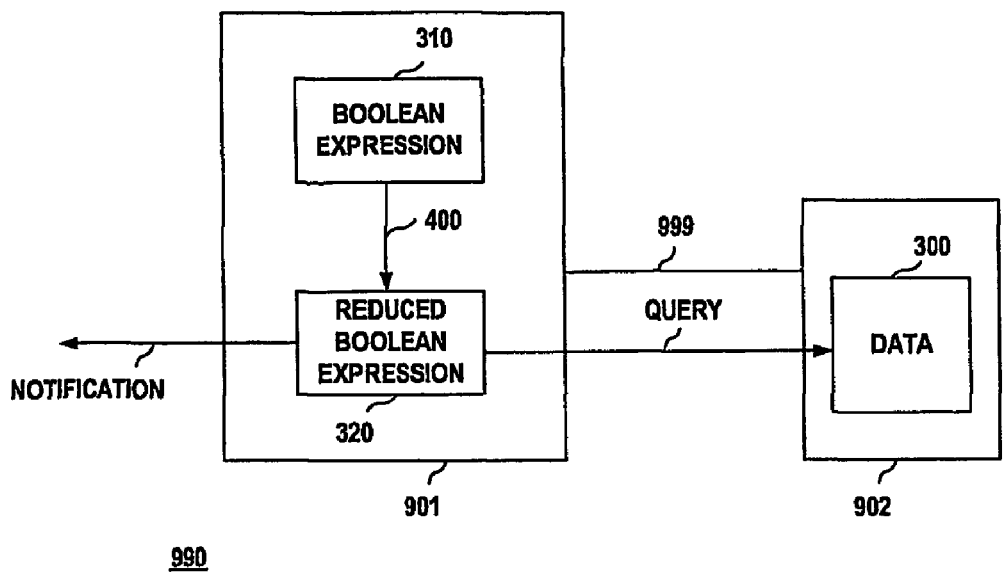
FIG. 1 is a simplified block diagram of a computer system that can be used with an embodiment of the invention.

FIG. 1 is a simplified block diagram of a computer system 990 that can be used with an embodiment of the invention. The computer system 990 includes multiple computing devices (e.g., first computing device 901 and second computing device 902) that communicate over a network 999, such as a local area network (LAN), wide area network (WAN), the Internet, or a wireless network.

For example, the second computing device 902 may be a backend system, such as a database system, a file system or an application system, that stores data 300. The data 300 can also be stored anywhere inside or outside of the computer system 990.

The first computing device 901 may be used to compose Boolean expressions 310 to be used in a QUERY for retrieving selected data from the second computing device 902. For example, the first computing device 901 may be a front end computer that provides a graphical user interface (GUI) to a user.

In one embodiment of the invention, the first computing device 901 can run a computer program product loaded into a memory of the first computing device to perform a method 400 for logically evaluating the Boolean expression 310 and create a reduced Boolean expression 320 that is used in the query statement instead. The computer program product includes various portions of computer program instructions that cause at least one processor of the first computing device 901 to execute corresponding steps and functions of the method 400.

In one aspect of the invention, algorithms and methods described in the following description are used to reduce the number of conditions in the Boolean statement 310 by eliminating logical redundancies.

In another aspect of the invention, the first computing device 901 can avoid sending queries to the second computing device 902 if it is clear in advance from a logical point of view that, independently of the given data, the query result set will either be empty or comprise all the records available in the second computing device 902, so that there is no selectivity. A corresponding notification may be sent to the user. The user can be a human user but can also be a further computing device communicating with the first computing device 901 over the network 999.

Figure 2:
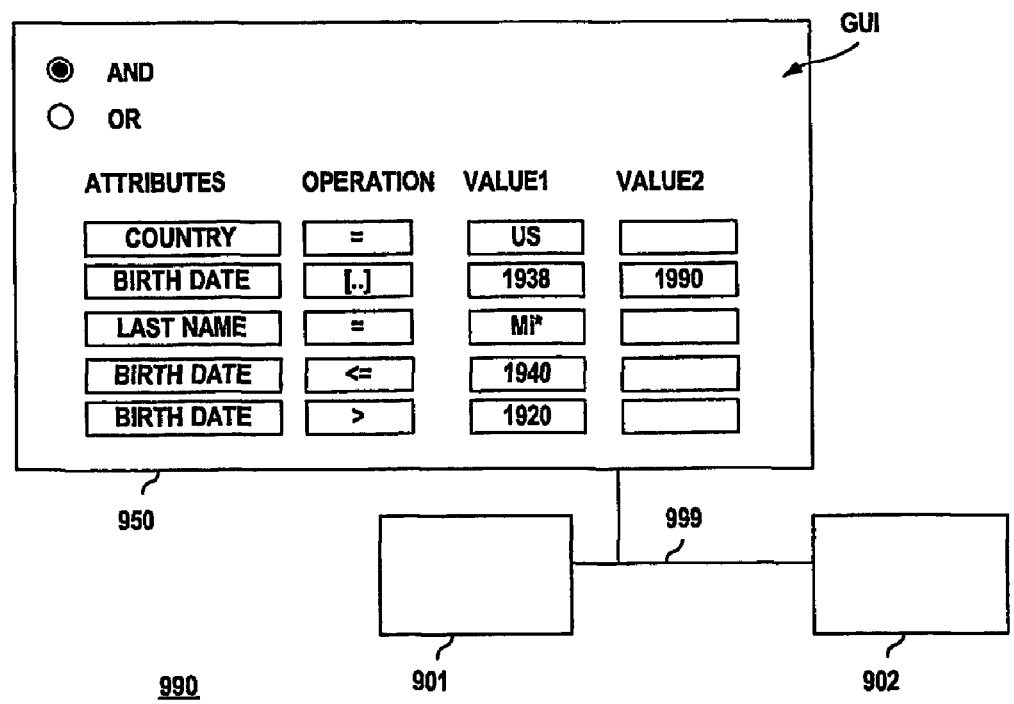
FIG. 2 shows an example of a graphical user interface that can be provided by the computer system to a user.

FIG. 2 shows an example of a GUI that can be provided by the computer system 990 to a human user. The GUI can be presented to the user on an output device 950, such as a monitor. In the example, the output device 950 is connected to the first computing device 901 over the network 999. However, the output device 950 can also be an integral part of any computing device in the computer system 990, in which case the communication between the computing device and the output device would advantageously be handled through an internal bus. In the following examples, it is assumed that the first computing device implements the GUI. However, the GUI may also be implemented by any other computing device in the computer system 990. In this case the functionality described hereinafter as being performed by the first computing device 901 would be performed by the other computing device.

The GUI can provide to the user specific user interface components (e.g., ATTRIBUTES column, OPERATION column, VALUE1 column, VALUE2 column, AND/OR radio buttons) that allow the user to compose Boolean expressions. For example, the user can enter selection attributes (referred to hereinafter as attributes), such as COUNTRY, BIRTH DATE, or LAST NAME in the ATTRIBUTES column. Relationship operators can be entered in the OPERATION column. VALUE1 and VALUE2 can be used to enter condition values with respect to the attribute and the relationship operator in the corresponding row. Advantageously, the user can select some or all entries to be made from corresponding reservoirs that can be visualized, for example, in a drop-down list box or a value help pop-up. For example, the GUI can support the user to compose the Boolean expression 310 in disjunctive or conjunctive normal forms by using the AND/OR radio buttons accordingly.

In the example, three conditions referring to the attribute BIRTH DATE have been entered.

BIRTH DATE [. .] 1938 and 1990
BIRTH DATE <=1940
BIRTH DATE >1920

Assuming that they are combined with a Boolean AND (e.g., by selecting the corresponding radio button), from a logical point of view they can be replaced by a single condition: BIRTH DATE [. .] 1938 and 1940. This condition becomes part of the reduced Boolean expression 320. The reduced Boolean expression 320 may either be displayed on the UI or performed behind the scenes, so that the UI does not display the change but simply sends the optimized QUERY including the reduced Boolean expression 320 to the second computing device 902.

Figure 3:
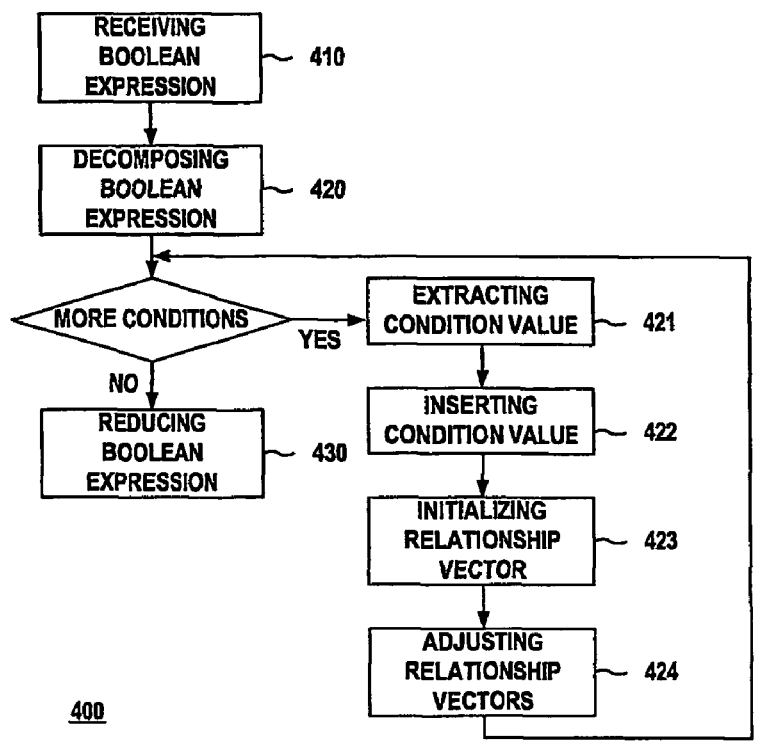
FIG. 3 is a simplified flowchart of a method that can be performed by an embodiment of the invention.

FIG. 3 is a simplified flowchart of the method 400 for logically evaluating a Boolean expression 310 used in a query statement that can be performed by an embodiment of the invention. For example, the method 400 can be executed by the first computing device 901.

The Boolean expression 310 refers to an attribute and includes a plurality of conditions $C_i$, $i=1 \ldots m$ (all indices used in the description are elements of the natural numbers) comprising the steps.

In the receiving step 410, the computer system 990 (cf. FIG. 1) receives the Boolean expression 310. For example, as described in FIG. 2, a user enters the Boolean expression in a corresponding GUI. Alternatively, the Boolean expression can be received by any computing device in the computer system 990 from another computing device.

In the decomposing step 420, the Boolean expression is decomposed into the plurality of conditions $C_i$, $i=1 \ldots m$. The computer system 990 can achieve that by using a parser that is able to recognize Boolean and relationship operators.

For each condition $C_i$ of the plurality the following steps are performed:

Extracting 421 at least one condition value referring to the attribute from the condition $C_i$. The at least one condition value defines a value range of the condition. In the example of FIG. 2, the first condition includes the two condition values 1938 and 1990 to be retrieved. In this case, one condition value represents the minimum condition value and the other condition value represents the maximum condition value of the value range covered by the first condition. The second condition includes only one condition value 1940, defining the maximum condition value of the value range of the second condition. Depending on the relationship operator used in the condition, the maximum and/or minimum condition values are included in or excluded from the value range of the condition. In case the equal to (=) operator is used, the value range corresponds to a single value, namely the corresponding identity condition value.

Inserting 422 the at least one condition value in a condition value list in sorted order. The condition value list can be implemented as a data structure, such as for example a list structure or table structure. Advantageously, a linear, bi-directional pointer list of objects is used. In this case, two pointers are used between two list elements, pointing in opposite directions. This allows the list to be traversed in both directions. Each object represents a condition value. The insertion in sorted order can be achieved by either inserting the condition value immediately at its final location or inserting it anywhere, e.g., at the end of the data structure, and applying an appropriate sort algorithm.

Initializing 423 a relationship vector of the at least one condition value. In one implementation the relationship vector includes a LESS THAN component, an EQUAL TO component, and a GREATER THAN component. Advantageously, each of these three components is realized as a counter. In this implementation, each relationship vector component of the at least one condition value is set to an initial value if the condition list has no further condition value. Advantageously, the initial value is zero but other values can be used instead. In other words, the relationship vector components of the first condition value that is added to an empty condition value list are all set to the same initial value.

If the condition value list already includes other condition values, two alternative mechanisms may be used for initializing. In a first alternative, each relationship vector component of the inserted condition value is set to the LESS THAN component value of the relationship vector of the next greater condition value in the condition value list. In a second alternative, each relationship vector component of the inserted condition value is set to the GREATER THAN component value of the relationship vector of the next smaller condition value in the condition list. Only one of the two alternatives applies, if the condition value is inserted at the beginning (first alternative) or at the end (second alternative) of the condition value list.

Adjusting 424 the relationship vectors for the at least one condition value of the condition Ci and each further condition value that is in the condition list and that is in the value range of the condition Ci. Once the condition value is inserted, at least one relationship vector component for the at least one condition value is incremented by an increment to reflect the relationship operator of the condition. For example, the increment is 1 but any other increment can be used instead. For example, if the relationship operator of the condition is "=", then the EQUAL TO component is incremented. If the relationship operator of the condition is ">=", then the EQUAL TO component and the GREATER THAN component are incremented. If the relationship operator of the condition is "<", then the LESS THAN component is incremented.

After the relationship vector for the inserted condition value has been adjusted according to the condition that is currently being processed, the increment is propagated through each relationship vector component of each further condition value in the condition list as long as the further condition value is within the value range of the currently processed condition. In other words, each relationship vector component of each further condition value in the condition value list is incremented if the further condition value belongs to a value range affected by the currently processed condition.

Once all conditions of the Boolean expression 310 referring to the attribute have been processed, in some cases the Boolean expression 310 can be reduced 430 to the reduced Boolean expression 320 according to each relationship vector. Depending on the Boolean operator that is used for combining the conditions in the Boolean expression 310, various subsets of condition values can be identified.

If the AND-operator is used, an AND -subset 201 (cf. FIGS. 4 and 6) of condition values may be identified in the condition list. Each of the subset condition values has at least one relationship vector component that has a value equal to the increment multiplied by the number of conditions in the plurality of conditions of the Boolean expression 310. The reduced Boolean expression 320 can be composed by combining the AND-subset condition values with Boolean operators and with relationship operators according to their relationship vectors. If the AND-subset 201 is empty, it indicates that no data records can fulfill the Boolean expression 310. In this case, a corresponding notification (NOTIFICATION, cf. FIG. 1) can be sent to the user before or instead of sending the query.

If the OR-operator is used, an OR-subset 202 (cf. FIG. 6) of condition values may be identified in the condition value list. In one implementation, the OR-subset 202 of condition values in the condition list includes at least one subset condition value that has at least one relationship vector component with the initial value. This OR-subset includes the condition values of the condition value list having a value range where at least one value does not fulfill the Boolean expression 320. The reduced Boolean expression 320 can be composed by combining the OR-subset condition values with Boolean operators and with relationship operators according to their relationship vectors. In this implementation the reduced Boolean expression 320 can be composed by excluding the non-fulfilling values from the results of the reduced Boolean expression. For example, the OR-subset includes a value "5" and the EQUAL TO component has the initial value. Then the reduced Boolean expression can be "<>5".

In another implementation the OR-subset of condition values in the condition list includes at least one subset condition value that has at least one relationship vector component with a value greater than the initial value. In this implementation the OR-subset includes the condition values of the condition value list having a value range where at least one value fulfills the Boolean expression 320. In this implementation the reduce Boolean statement can be composed by including all fulfilling value in the reduced Boolean expression.

If the OR-subset 202 indicates no selectivity of the Boolean expression at all, a corresponding notification (NOTIFICATION, cf. FIG. 1) can be sent to the user before or instead of sending the query. In the case of a human user this can be a visual notification (e.g., a pop-up) or a sound (e.g., a message or beep). In case of a non-human user (e.g., computing device) the notification may be implemented by raising an event, an error message, or a warning in a format that can be processed by the non-human user.

Therefore, the logical evaluation of the Boolean expression 310 by the first computing device 901 can finally lower the workload of the second computing device 902 by preventing the sending of queries that do not deliver useful results.

Those skilled in the art can apply the method also to multidimensional attributes, such as vectors or matrices. For such attributes the method 400 is performed for each attribute component in the described way.

Figure 4:
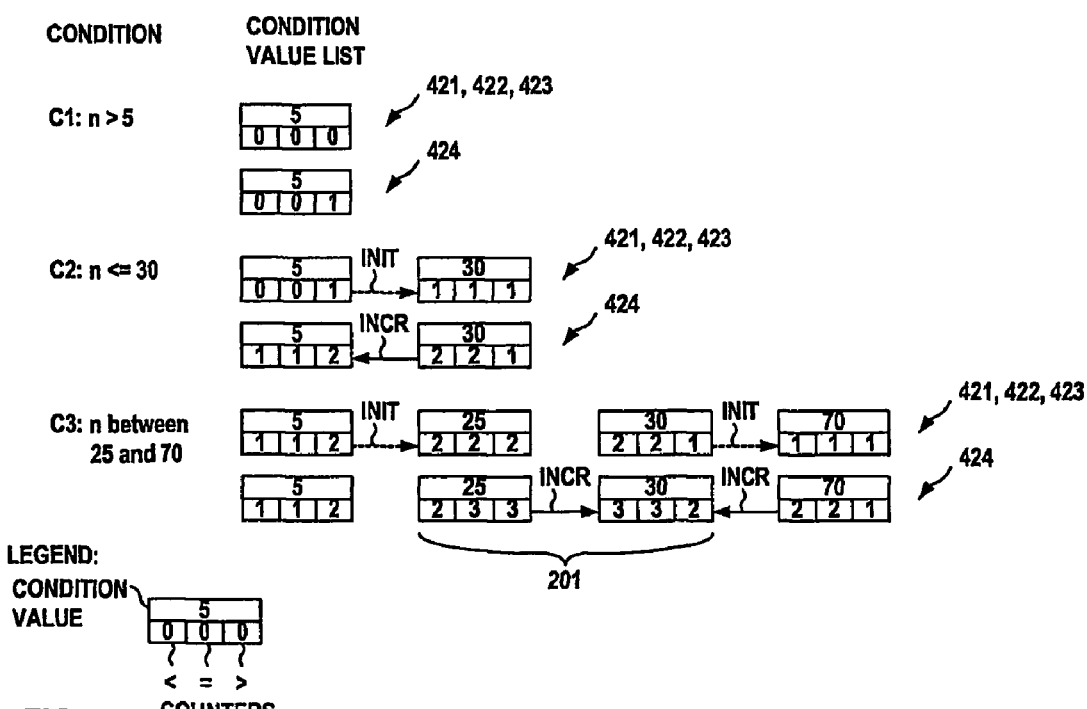
FIG. 4 illustrates a first example of applying the method referring to a numerical attribute.

FIG. 4 illustrates a first example of applying the method 400 referring to a numerical attribute.

In this first example, the computer system 990 has received 410 a Boolean expression 310 including the following conditions referring to an attribute n:

C1: n>5
C2: n<=30
C3: n between 25 and 70

All three conditions are combined with the Boolean AND operator.

For example, the first computing device 901 runs a logical evaluation of the Boolean expression 310 to determine whether the three conditions can be summarized by fewer conditions and whether it is logically the case that either zero data records or all data records stored in the second computer device will match the set of conditions.

List elements of the condition value list are illustrated as boxes having four portions. The upper portion includes the condition value. The lower three portions represent three components of the relationship vector for the condition value. The lower left portion includes the LESS THAN component ("<" counter), the lower middle portion includes the EQUAL TO component ("=" counter), and the lower right portion includes the GREATER THAN component (">" counter). The notation condition value/("<" counter,"=" counter,">" counter) for elements of the condition value list is used in all of the following examples. For each condition, two rows are shown in the condition value list. The upper row shows the condition values with their relationship vectors after extracting 421, inserting 422, and initializing 423 with respect to the current condition. The lower row illustrates the status after adjusting 424 (cf. FIG. 3).

In the set of conditions, the four condition values "5", "30", "25", and "70" occur. Therefore, after all the condition values have been inserted, the condition value list contains four list elements.

First, condition C1 is processed. The condition value "5" is inserted and the relationship vector is initialized to the initial value (0,0,0) because no other condition value is included in the condition list at that time. The relationship operator of C1 is ">". Therefore, the ">" counter is incremented. The increment used in the example is 1. The list element 5/(0,0,1) now reflects the condition ">5" with reference to the attribute n of the condition C1.

Then condition C2 is processed. The condition value "30" is inserted and its relationship vector is initialized (INIT) with the GREATER THAN component value "1" of the relationship vector of the next smaller condition value "5". Now the whole condition value list represents the condition ">5". The initialized relationship vector (1,1,1) is then adjusted by incrementing the "<" counter and the "=" counter. The list element 30/(2,2,1) now reflects the condition "<= 30" with reference to the attribute n of the condition C2. Then the increment is propagated (INCR) to the relationship vector of the list element 5/(0,0,1), whose condition value "5" is in the value range of condition C2. This results in the adjusted list element 5/(1,1,2). Now the condition value list represents condition C2 in addition to condition C1.

Finally condition C3 is processed. Both condition values "25" and "70" are inserted in the condition value list in sorted order. After initialization (INIT) of the respective relationship vectors, the list elements 25/(2,2,2) and 70/(1,1,1) are included so that the whole condition value list still represents condition C2 in addition to condition C1. The relationship vectors of the new inserted condition values are the adjusted to reflect condition C3. The condition C3 "between 25 and 70" is a combination of the two conditions "≧25" and "≦70". Therefore, the corresponding relationship vector components are incremented accordingly, resulting in list elements 25/(2,3,3) and 70/(2,2,1). Because the condition value "30" is within the value range of condition C3, the increment is propagated to its corresponding relationship vector, resulting in the list element 30/(3,3,2). Now the whole condition value list represents all three conditions C1, C2, and C3 (">5", "≦30", and "between 25 and 70" with reference to attribute n).

The first computing device 901 may now identify the AND-subset 201 that includes condition values in the condition value list where each of the subset condition values has at least one relationship vector component that has a value equal to the increment multiplied by the number of conditions in the plurality. In the example, the increment is "1" and the number of conditions is "3". That is, any list element having a relationship vector that includes at least one vector component with a value of 3 is part of the intersection of all three conditions. As the list elements 25/(2,3,3) and 30/(3,3,2) fulfill this requirement, they form the AND-subset 201.

Based on the AND-subset 201, the reduced Boolean expression 320 can be composed because the three conditions of the example can be reduced to a single condition: 25 ≦n ≦30 (n between 25 and 30).

FIG. 5 illustrates a second example of applying the method 400 referring to the numerical attribute n.

In this second example, the computer system 990 has received 410 a Boolean expression 310 including the following conditions referring again to the attribute C1": n=100
C2": n not between 70 and 90
C3": n>60
C4": n<10
C5": n<>95

All five conditions are combined with the Boolean OR operator, for example, by selecting the OR radio button in the GUI of FIG. 2 and entering the conditions for the attribute accordingly.

The list element for the condition value "100" of condition C1' is adjusted after insertion and initialization to reflect the "=" relational operator by incrementing the "=" counter in the relationship vector. This results in the list element 100/(0,1,0).

The two condition values "70" and "90" are extracted from condition C2'. The relational operator "not between" corresponds to "<" AND ">". Therefore, the "<" counter of the condition value "70" and the ">" counter of the condition value "90" are incremented accordingly, resulting in the list elements 70/(1,0,0) and 90/(0,0,1). To consistently reflect the conditions C1' and C2' in the condition value list, the third list element having the condition value "100" (which is in the value range of condition C2') is adjusted by incrementing (INCR) the relationship vector components. The result is 100/(1,2,1).

Condition C3' includes all previously inserted condition values in its value range. Therefore, after having initialized (INIT) the list element for the condition value "60" to 60/(1,1,1) and after having adjusted the list element to 60/(1,2,2), the increment is propagated (INCR) to all further list elements. This results in the adjusted list elements 70/(2,1,1), 90/(1,1,2)), and 100/(2,3,2).

The value range of condition C4' does not affect any of the previously inserted list elements. Therefore, only the list element including the condition value "10" needs to be adjusted to reflect the "<" operator by incrementing the "<" counter after initialization (INIT). The result is the list element 10/(2,1,1).

Condition C5' excludes the condition value "95" from the result records of the Boolean expression 310. However, all previously inserted list elements fall within the value range of condition C5'. Therefore, after initialization (INIT) to 95/(2,2,2) the corresponding "<" counter and the ">" counter are incremented to 95/(3/2/3) and the increment is propagated (INCR) to the relationship vectors of all other list elements in the condition value list. The final result of the condition value list including all five conditions is: 10/(3,2,2), 60/(2,3,3), 70/(3,2,2), 90/(2,2,3), 95/(3/2/3), and 100/(3,4,3).

As the Boolean expression combines the five conditions with OR, at least one of the five conditions must match, that is, the relationship vector components must at least have the value of an increment (1 in the example). Since all vector components of all list elements in FIG. 5 have a value of at least "1", at least all the condition values between "10" and "100" lie in the matching value range. However, in the list element for the condition value "100", the ">" counter is also greater than 1. Therefore, all values greater than "100" also match the five conditions. Similarly, in the list element for the condition value "10", the "<" counter is greater than 1, so all values less than 10 also match the five conditions. Therefore, an OR-subset including condition values having at least one vector component that has the initial value "0" cannot be identified.

The conclusion is that all possible values match the five conditions C1' to C5' when combined with OR, and thus the selectivity is zero. A corresponding reduced Boolean expression is not meaningful in this case, since all records available in the second computing device 902 match the five conditions. Therefore, it is not worthwhile sending a corresponding query. For example, the first computing device 901 can suppress the sending of the query. In addition, the first computing device 901 may send a corresponding notification to the user by, for example, displaying an information popup for the user.

If the five conditions were combined with AND, the corresponding AND-subset would be empty, since none of the relationship vector components of any of the list elements has a counter value of "5" (number of conditions times the increment). So independently of the given data it is impossible from a logical point of view to fulfill all five conditions at the same time. Therefore, it makes no sense to send such a query statement, which might also include further conditions, to the second computing device. The first computing device can simply inform the user using the GUI about that I this case the result set is empty, for example, with a pop-up or a corresponding sound message. The second computing device is freed from useless workload and can use the corresponding computing capacity otherwise.

FIG. 6 illustrates a third example of applying the method 400, in this case referring to an alphanumeric attribute.

The method 400 and the corresponding algorithms as discussed in FIGS. 4 and 5 may also be applied to alphanumeric data. The example of FIG. 6 uses family names (LAST NAME, cf. FIG. 2) as an example of an alphanumeric attribute. Not all operators are covered in this example. Theoretically, all relational operators already used in FIGS. 4,5 may be used. However, in practice it is rather unusual for value ranges (like LAST NAME<"Smith" or LAST NAME between "Miller" and "Smith") to be selected on alphanumeric attributes.

In contrast to searches using numerical attributes, wild cards such as "*" may be used with alphanumeric attributes. This third example illustrates the usage of a "*" wild card at the end of a string. Those skilled in the art can apply the findings to other wild card patterns or similar patterns.

Assume that a Boolean expression is received that includes the following conditions referring to the attribute a standing for LAST NAME:
C1": a=Mi*
C2": a=Miller
C3": a<>Smith
The Boolean expression combines all three conditions with AND.

The third example shows the successive application of the three conditions and the resulting condition value list with the respective relationship vector components.

Since the wild card "*" indicates a value range, a condition like C1" is represented by two list elements. In this example, the condition "=Mi*" may be represented as "≧Mi" and "≦MiZZZZZZZZZZZZZ . . .". The upper bound of the value range may be represented as written here using the capital letter "Z", which is the letter of the alphabet with the highest ASCII number. The number of times "Z" is repeated equals the number of characters remaining in the string. For example, the value "Mi" has a length of 2 characters. If a meta data declaration for the attribute (e.g., LAST NAME) has a length of 60 characters, then 60−2=58 characters remain to be filled up with "Z".

An advantageous alternative to represent the upper bound for the condition is to write "Mi*" for the upper bound. Here the upper bound is not defined explicitly. The wild card "*" indicates only that this element is used as the upper bound of a range, where it is implicitly clear that there is no combination of letters starting with "Mi" that lies beyond the upper bound.

In an embodiment of the invention, the proposed algorithm works without an explicit upper bound. A placeholder for an upper bound is sufficient. This is convenient, as it means that no string operation has to be performed to fill up the string with characters such as "Z", and no meta data information needs to be evaluated to calculate the number of characters to add.

The condition value list of the third example is created in a similar way as explained in the first and second examples. After having processed all three conditions C1" to C3", the condition value list includes the list elements Mi/(1,2,2), Miller/(2,3,2), MI*/(2,2,1), and Smith/(1,0,1).

The first computing device 901 may now identify the AND-subset 201 that includes the condition value of the list element Miller/(2,3,2) because it is the only condition value having at least one relationship vector component that has a value equal to the increment (in this case, 1) multiplied by the number of conditions (in this case, 3).

Based on the AND-subset 201, the reduced Boolean expression 320 can be composed because the three conditions of the example can be reduced to a single condition: a="Miller". The other conditions are redundant.

If the three conditions were combined in the Boolean expression 310 by the Boolean OR operator, the first computing device may identify an OR-subset 202 of condition values in the condition value list having at least one subset condition value that has a relationship vector with at least one relationship vector component being different from the initial value "0". In the example, this is true for the condition value of the list element Smith/(1,0,1). Since the "=" counter for "Smith" is still "0" but all other vector components have values ≧1, the equivalent condition for the reduced Boolean statement 320, which can replace the three original conditions C1" to C3", is: a<> Smith. The other conditions are redundant.

Sometimes it is not possible to reduce the plurality of conditions to just one condition, but two or more conditions remain, each representing an interval which is disjoint from the other intervals. Assume these disjoint intervals refer to an attribute (numerical or alphanumeric) with a cardinality small enough that the entire list of attribute values is stored locally in the first computing device. For example, an attribute COUNTRY may have a cardinality of 100, and the list of 100 different values for COUNTRY may be stored locally in the first computing device. Now assume that a set of N conditions is reduced to two disjoint intervals (two conditions). If no values occur between the inner interval boundaries, so that these boundaries are in fact neighboring points, then the two disjoint intervals may be united into one result interval, with the result that the two conditions are further reduced to just one condition. This principle may be generalized for the unification of more than two intervals. It may occur that only some of the intervals can be merged into one interval whereas other intervals cannot be merged because there are values between the interval boundaries that do not match the conditions. Even in such cases, a reduction of the original number of conditions is obtained, resulting in less workload for the second computing device.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Also, computer-readable storage mediums suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer implemented method for logically evaluating a Boolean expression used in a query statement, wherein the Boolean expression refers to an attribute and includes a plurality of conditions, the method comprising:
   receiving the Boolean expression;
   decomposing the Boolean expression into the plurality of conditions;
      wherein each condition of the plurality of conditions includes an attribute name, a relational operator, and at least one condition value;
   for each condition of the plurality of conditions, extracting at least one condition value referring to the attribute name for a condition of the plurality of conditions, wherein the at least one condition value defines a value range of the condition of the plurality of conditions;
   inserting the at least one condition value in a condition value list in sorted order;
   initializing, by a computer, a relationship vector for the at least one condition value, wherein each relationship vector component in the relationship vector is a relational operator counter and initializing the relationship vector comprises setting the relational operator counter for each of the relationship vector components to an initial value; and
   adjusting the relationship vectors for the at least one condition value and for each further condition value that is in the condition list that is in the value range of the condition of the at least one condition value by adjusting the relational operator counters, wherein adjusting the relationship vectors comprises:

incrementing at least one of the relationship vector components for the at least one condition value by an increment to reflect the condition, and propagating the increment through each of the relationship vector components for each further condition value in the condition list as long as the further condition value is within the value range of the condition; and reducing the Boolean expression according to each relationship vector.

2. The method of claim 1, wherein extracting the at least one condition value referring to the attribute name for the condition of the plurality of conditions comprises:

retrieving a maximum condition value or a minimum condition value of the condition.

3. The method of claim 1, wherein extracting the at least one condition value referring to the attribute name for the condition of the plurality of conditions comprises:

retrieving an identity condition value of the condition.

4. The method of claim 1, wherein initializing the relationship vector comprises:

initializing the relationship vector as including a LESS THAN component value, an EQUAL TO component value or a GREATER THAN component value.

5. The method of claim 4, wherein initializing the relationship vector comprises:

setting each relationship vector component for the at least one condition value to an initial value if the condition list has no further condition value;

setting each relationship vector component to the LESS THAN component value of the relationship vector for the next greater condition value in the condition value list; or setting each relationship vector component to the GREATER THAN component value of the relationship vector for the next smaller condition value in the condition value list.

6. The method of claim 1, wherein reducing the Boolean expression comprises:

identifying an AND-subset of condition values in the condition value list, where each subset condition value has at least one relationship vector component that has a value equal to the increment multiplied by the number of conditions in the plurality of conditions.

7. The method of claim 6, wherein reducing the Boolean expression further comprises:

composing a reduced Boolean expression based on the AND-subset.

8. The method of claim 1, wherein reducing the Boolean expression comprises:

identifying an OR-subset of condition values in the condition value list, where each subset condition value has at least one relationship vector component with the initial value.

9. The method of claim 8, wherein reducing the Boolean expressions further comprises:

composing a reduced Boolean expression based on the OR-subset.

10. The method of claim 6, further comprising: if the AND-subset is empty, sending a corresponding notification to a user.

11. The method of claim 8, further comprising: if the OR-subset is empty, sending a corresponding notification to a user.

12. The method of claim 1, wherein reducing the Boolean expression comprises:

composing a reduced Boolean expression, where the reduced Boolean expression comprises a condition that merges at least a first condition and a second condition, the first and second conditions referring to the attribute and representing disjoint intervals, the attribute having no values between the inner interval boundaries of the disjoint intervals.

13. A computer-readable storage medium storing a computer program product for logically evaluating a Boolean expression used in a query statement, the computer program product including executable instructions that, when executed, is configured to cause at least one processor of a computing device to:

receive the Boolean expression;

decompose the Boolean expression into the plurality of conditions,
wherein each condition of the plurality of conditions includes an attribute name, a relational operator, and at least one condition value;

for each condition of the plurality of conditions, extracting at least one condition value referring to the attribute name for a condition of the plurality of conditions, wherein the at least one condition value defines a value range of the condition of the plurality of conditions;

insert the at least one condition value in a condition value list in sorted order;

initialize a relationship vector for the at least one condition value, wherein each relationship vector component in the relationship vector is a relational operator counter and the instructions that cause the processor to initialize the relationship vector comprises instructions that cause the processor to set the relational operator counter for each of the relationship vector components to an initial value; and adjust the relationship vectors for the at least one condition value and for each further condition value that is in the condition list that is in the value range of the condition of the at least one condition value by adjusting the relational operator counters, wherein the instructions that cause the processor to adjust the relationship vectors comprise instructions that cause the processor to:

increment at least one of the relationship vector components for the at least one condition value by an increment to reflect the condition, and propagate the increment through each of the relationship vector components for each further condition value in the condition list as long as the further condition value is within the value range of the condition; and reduce the Boolean expression according to each relationship vector.

14. A computer system for logically evaluating a Boolean expression used in a query statement, wherein the Boolean expressions refers to an attribute and includes a plurality of conditions, comprising:

a memory to receive the Boolean expression and to store a condition value list; and having at least one processor for executing computer program instructions to:

decompose the Boolean expression into the plurality of conditions,
wherein each condition of the plurality of conditions includes an attribute name, a relational operator, and at least one condition value;

for each condition of the plurality, extract at least one condition value referring to the attribute name for a condition of the plurality of conditions, wherein the at least one condition value defines a value range of the condition of the plurality of conditions;

insert the at least one condition value in the condition value list in sorted order;

initialize a relationship vector for the at least one condition value, wherein each relationship vector component in the relationship vector is a relational operator counter and the instructions that cause the processor to initialize the relationship vector comprises instructions that cause the processor to set the relational operator counter for each of the relationship vector components to an initial value; and adjust the relationship vectors for the at least one condition value and for each further condition value that is in the condition list that is in the value range of the condition of the at least one condition value by adjusting the relational operator counters, wherein the computer program instructions causing the at least one processor to adjust the relationship vectors comprise:

a first portion to increment at least one of the relationship vector components for the at least one condition value by an increment to reflect the condition, and a second portion to propagate the increment through each of the relationship vector components for each further condition value in the condition list as long as the further condition value is within the value range of the condition; and wherein the at least one processor further executes computer program instructions to reduce the Boolean expression according to each relationship vector.

15. The computer system of claim 14, wherein the relationship vector comprises a LESS THAN component value, an EQUAL TO component value, and a GREATER THAN component value.

16. The computer system of claim 15, wherein the computer program instructions causing the at least one processor to initialize comprise:

a first portion to set each relationship vector component for the at least one condition value to an initial value if the condition list has no further condition value; and a second portion to set each relationship vector component to the LESS THAN component value of the relationship vector for the next greater condition value in the condition value list, or to set each relationship vector component to the GREATER THAN component value of the relationship vector for the next smaller condition value in the condition value list.

17. The computer system of claim 14, wherein the memory stores an AND-subset of condition values in the condition value list, where each subset condition value has at least one relationship vector component that has a value equal to the increment multiplied by the number of conditions in the plurality of conditions.

18. The computer system of claim 17, wherein the at least one processor executes further computer program instructions to compose a reduced Boolean expression based on the AND-subset.

19. The computer system of claim 14, wherein the memory stores an OR-subset of condition values in the condition value list, where each subset condition value has at least one relationship vector component with the initial value.

20. The computer system of claim 14, wherein the memory stores an OR-subset of condition values in the condition value list, where each subset condition value has at least one relationship vector component with a value greater than the initial value.

21. The computer system of claim 19, wherein the at least one processor executes further computer program instructions to compose a reduced Boolean expression based on the OR-subset.

22. The computer system of claim 17, where the at least one processor executes further computer program instructions to send a corresponding notification to a user, if the AND-subset is empty.

23. The computer system of claim 19, where the at least one processor executes further computer program instructions to send a corresponding notification to a user, if the OR-subset is empty.

24. The computer system of claim 18, where the memory stores a list of all values of the attribute name; and the at least one processor executes further computer program instructions to merge at least a first condition and a second condition, the first and second conditions referring to the attribute name and representing disjoint intervals, the attribute name having no values between the inner interval boundaries of disjoint intervals.

* * * * *